(12) United States Patent
Mak et al.

(10) Patent No.: US 12,361,240 B2
(45) Date of Patent: Jul. 15, 2025

(54) METHOD AND SYSTEM FOR REDUCING PERCEIVED ILLUMINATION FLICKER IN MULTI-SENSOR BARCODE SCANNERS

(71) Applicant: ZEBRA TECHNOLOGIES CORPORATION, Lincolnshire, IL (US)

(72) Inventors: Jason S Mak, Commack, NY (US); Justin F. Barish, Kings Park, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/759,770

(22) Filed: Jun. 28, 2024

(65) Prior Publication Data

US 2025/0173530 A1    May 29, 2025

Related U.S. Application Data

(60) Provisional application No. 63/602,634, filed on Nov. 26, 2023.

(51) Int. Cl.
*G06K 7/10* (2006.01)

(52) U.S. Cl.
CPC ..... *G06K 7/10732* (2013.01); *G06K 7/10752* (2013.01)

(58) Field of Classification Search
CPC .................. G06K 7/10732; G06K 7/10752
USPC .......................................................... 235/375
See application file for complete search history.

(56) References Cited

U.S. PATENT DOCUMENTS

| | | | |
|---|---|---|---|
| 2012/0081566 A1* | 4/2012 | Cote | H04N 23/74 348/222.1 |
| 2017/0099102 A1 | 4/2017 | Oshima et al. | |
| 2017/0149500 A1 | 5/2017 | Aoyama et al. | |
| 2019/0334619 A1 | 10/2019 | Aoyama et al. | |

OTHER PUBLICATIONS

International Search Report and Written Opinion for International Patent Application No. PCT/US2024/057358 mailed on Jan. 27, 2025.

* cited by examiner

*Primary Examiner* — Toan C Ly
(74) *Attorney, Agent, or Firm* — Yuri Astvatsaturov (57) ABSTRACT

The present disclosure describes methods and systems for reducing perceived flickering in multi-sensor barcode scanners. The proposed solution introduces a dummy illumination pulse during transitions between sensors or frames, mitigating noticeable flicker. The timing, duration, and spacing of the dummy pulse are calculated based on factors such as the next expected exposure, frame rate, and/or previous exposure. This solution can be applied to a variety of barcode scanners, including those with different sensors for near and far scanning or those using different LEDs for capturing frames. The system also potentially includes an illumination boost circuitry that recharges during the generation of the dummy illumination pulse, preventing system faults. The method offers an effective solution to illumination flicker in multi-sensor barcode scanners without causing unnecessary delays or system errors.

20 Claims, 6 Drawing Sheets

METHOD AND SYSTEM FOR REDUCING PERCEIVED ILLUMINATION FLICKER IN MULTI-SENSOR BARCODE SCANNERS

CROSS-REFERENCE TO RELATED APPLICATIONS

The present disclosure claims priority to U.S. Provisional Patent Application Ser. No. 63/602,634, filed on Nov. 26, 2023, and incorporated herein by reference in its entirety.

BACKGROUND

Barcode scanners have become ubiquitous in various sectors due to their efficiency in managing inventory, tracking products, and facilitating transactions. In some instances, to increase a working range, scanners employ multiple imaging assemblies where one assembly is configured for relatively closer image capture operations and the other assembly is configured for relatively farther image capture operations, and each of these assemblies is commonly configured to operate with a respective illumination source like an LED or LED array. Upon activation of the scanner, a series of frames are captured following preconfigured sequences. Often, these sequences include several 'ranging' frames (special frames captured from one or more sensors to determine the appropriate focus), followed by one or more frames from one of the imaging assemblies, (e.g., a near range assembly), followed by one or more frames from the other assembly (e.g., a far range assembly).

In such scanners, a global shutter sensor is often used, where the illumination is pulsed, as opposed to a rolling shutter sensor where the illumination is constantly on. However, a problem arises with this global shutter sensor when the illumination pulses do not match roughly 60 hz, as they become noticeable to the user. This issue is particularly pronounced when switching between imaging assemblies, switching between 'ranging' frames and regular frames, and when restarting the sequence. The larger gaps between frames during these transitions lead to a perceived flicker in the illumination, which can be distracting and annoying to the user.

Previous solutions have failed to address this problem effectively, often leading to unnecessary delays in the system or potential faults in the illumination boost circuitry. Therefore, there is a need for a solution that can effectively reduce the perceived illumination flicker in multi-sensor barcode scanners without introducing unnecessary delays or potential system faults.

SUMMARY

In an embodiment, the present invention is a method for reducing perceived illumination flicker in a multi-sensor barcode scanner, the method comprising the steps of: initiating a first sensor sequence; transitioning to a second sensor sequence; and inserting a dummy illumination pulse during said transition, wherein said dummy illumination pulse is configured to mitigate said perceived illumination flicker.

In another embodiment, the present invention is a system for reducing perceived illumination flicker in a multi-sensor barcode scanner, the system comprising: a first sensor configured to capture a sequence of frames; a second sensor configured to capture a different sequence of frames; and a processor configured to generate and insert a dummy illumination pulse during the transition from the first sensor to the second sensor to mitigate the perceived illumination flicker.

In still another embodiment, the present invention is a method for reducing perceived illumination flicker in an imaging-based data capture device, the method comprising the steps of: performing a first image-capture operation including a last frame of the first image-capture operation; subsequent to performing the first image-capture operation, performing a second image-capture operation including a first frame of the second image-capture operation; and inserting at least one dummy illumination pulse during the last frame of the first image-capture operation, wherein a number N of the at least one dummy illumination pulses is based on at least one of a frame transmission time of the last frame of the first image-capture operation or an exposure duration of the first frame of the second image-capture operation.

In still yet another embodiment, the present invention is a

In the accompanying figures, like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention. In general, the same reference numbers will be used throughout the drawing(s) and accompanying written description to refer to the same or like parts.

The apparatus and method components have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein. Skilled artisans will readily recognize from the following discussion that alternate embodiments of the structures and methods illustrated herein may be employed without departing from the principles set forth herein.

DETAILED DESCRIPTION

Figure 1:
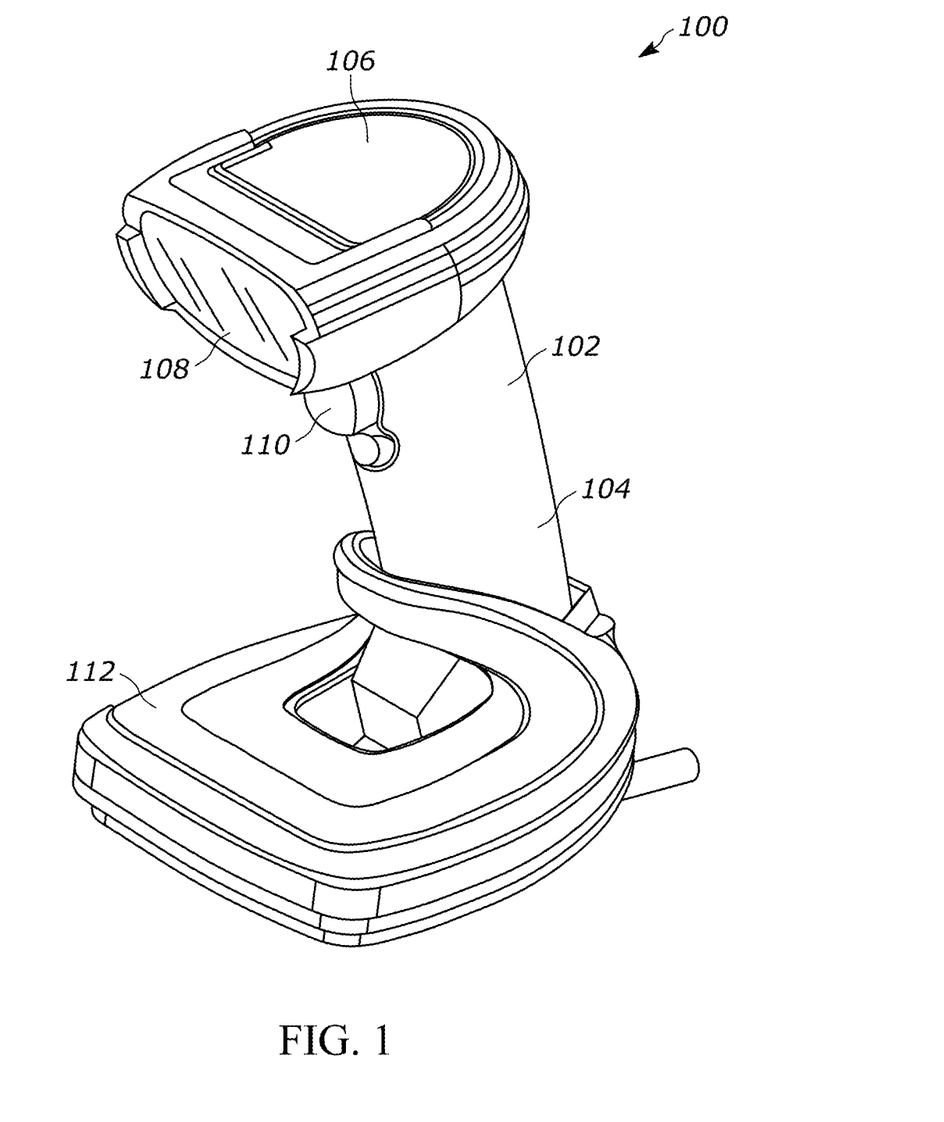
FIG. 1 illustrates a perspective view of a data capture device in accordance with an embodiment.

Referring now to the drawings, FIG. 1 illustrates an exemplary barcode reader 100 having a housing 102 with a handle portion 104, also referred to as a handle 104, and a head portion 106, also referred to as a scanning head 106. The head portion 106 includes a window 108, and is configured to be positioned on the top of the handle portion 104. The handle portion 104 is configured to be gripped by a reader user (not shown) and includes a trigger 110 for activation by the user. Included in the embodiment is also a base 112 attached to the handle portion 104 opposite the head portion 106. The base 112 is configured to stand on a surface and support the housing 102 in a generally upright position. The barcode reader 100 can be used in a hands-free mode as a stationary workstation when it is placed on a countertop. The barcode reader 100 can also be used in a handheld mode when it is picked up off the countertop and held in an operator's hand. In the hands-free mode, products can be slid, swiped past, or presented to the window 108. In the handheld mode, the barcode reader 100 can be moved towards a barcode on a product, and the trigger 110 can be manually depressed to initiate imaging of the barcode. In some implementations, the base 112 can be omitted, and the housing 102 can also be in other handheld shapes. Other implementations may provide only handheld or only hands-free configurations.

Figure 2:
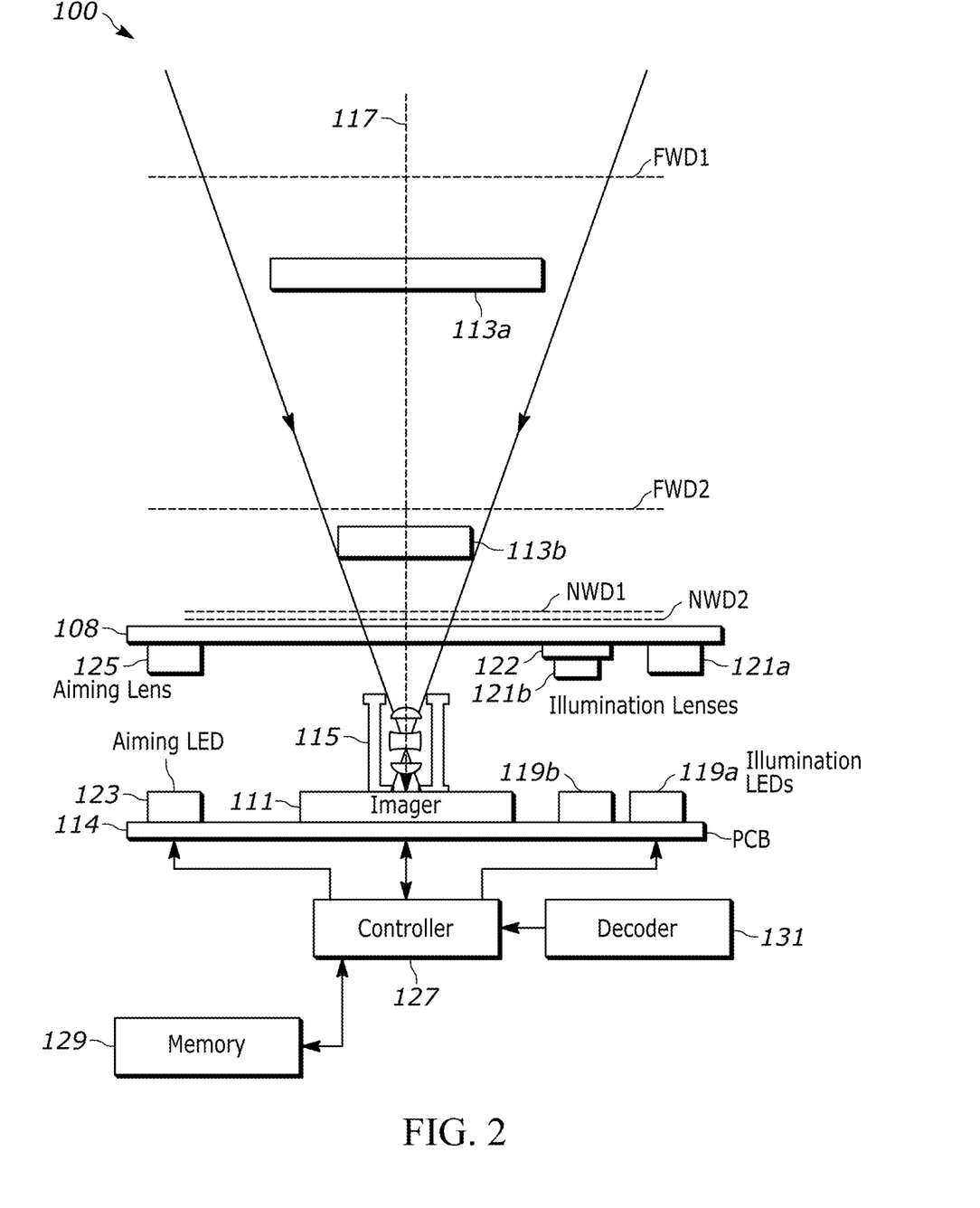
FIG. 2 is a schematic of various components of the data capture device of FIG. 1 in accordance with an embodiment.

Referring to FIG. 2, which depicts various components of the reader 100 of FIG. 1, an imaging assembly includes a light-detecting sensor or imager 111 operatively coupled to, or mounted on, a printed circuit board (PCB) 114 in the reader 100. In an embodiment, the imager 111 is a solid-state device, for example, a CCD or a CMOS imager having a two-dimensional array of addressable image sensors or pixels arranged in mutually orthogonal rows and columns and operating in a global shutter mode, and operative for detecting return light captured by an imaging lens assembly 115 over a field of view along an imaging axis 117 through the window 108. The return light is scattered and/or reflected from a target 113*a*, 113*b* over the field of view. The imaging lens assembly 115 is operative for automatically focusing the return light onto the array of image sensors to enable the target 113*a*, 113*b* to be in-focus and read. In particular, different barcode symbologies may need to be read at different distances, thereby requiring the imaging lens assembly 115 to have different focal planes in order to focus the image of the target on the imager 111. For example, the target 113*a* (e.g., Universal Product Code symbology) may be read from a distance farther from the imager 111, and therefore having a farther focal point, than the target 113*b* (e.g., direct part mark symbology, dot code symbology). Thus, the target 113*a* may be located anywhere in a first working range of distances between a first near working distance (NWD1) and a first far working distance (FWD1), and the target 113*b* may be located anywhere in a second working range of distances between a second near working distance (NWD2) and a second far working distance (FWD2). In a preferred embodiment, both NWD1 and NWD2 are immediately in front of the window 108, and FWD1 is about thirty inches from the window 108, whereas FWD2 is about three inches or less from the window 108.

As noted above, the imaging lens assembly 115 automatically focuses on the target 113*a*, 113*b* in the embodiment of FIG. 2. Any of a number of different mechanisms as understood by those of ordinary skill in the art may be used to vary the focal plane of the imaging lens assembly 115 and automatically focus on the target 113*a*, 113*b*. For example, the imaging lens assembly 115 may vary the focal plane by physically varying the distance of a focusing lens(es) from the surface of the imager 111 along the imaging axis 117 in order to focus the image of the target on the imager 111. In another example, the imaging lens assembly 115 may utilize a changeable focusing lens(es), such as a liquid lens, and vary the focal plane by varying the optical characteristics of the focusing lens(es) (e.g., by application of voltage to the lens) in order to focus the image of the target on the imager 111.

The amount by which the focal plane of the imaging lens assembly 115 is varied is dependent upon the distance of the target as detected by the reader 100. A number of techniques exist for determining how much to adjust the imaging lens assembly 115 to focus on the target, as understood by those of ordinary skill in the art. Broadly, the techniques may be categorized as either active autofocus, passive autofocus, or a hybrid of the two. Active autofocus typically uses time-of-flight techniques, such as a rangefinder (not shown) projecting light (e.g., infrared) or ultrasound onto the target, measuring the time to receive the return signal in order to measure the distance of the target, and adjusting the focal plane of the imaging lens assembly 115 accordingly. Passive autofocus typically uses phase detection and contrast detection. Phase detection compares the intensity pattern of two images produced in an array of auxiliary sensors (not shown) apart from the imager 111, and adjusts the focal plane of the imaging lens assembly 115 in proportion to the degree to which the images are out-of-phase until the images are synchronized. Contrast detection varies the focal plane of the imaging lens assembly 115 in order to maximize the contrast between adjacent pixels in the image.

One or more illuminating light assemblies are also mounted in the imaging reader 100. Each illuminating light assembly includes an illumination light source, such as at least one light emitting diode (LED) 119*a*, 119*b* and at least one illumination lens 121*a*, 121*b*, and preferably a plurality of illumination LEDs and illumination lenses, configured to generate a substantially uniform distributed illumination pattern of light on and along the target 113*a*, 113*b* to be read by image capture. At least part of the scattered and/or reflected return light is derived from the illumination pattern of light on and along the target 113*a*, 113*b*. In an embodiment, one of the illumination light assemblies includes a diffuser 122 for reading targets 113*b* that reflect the illumination light in several directions and/or have little contrast in the symbol, such as direct part marking. Preferably, the illumination light LED 119*b* uniformly illuminates most or all of the diffuser 122, which, in turn, diffuses the light from the illumination LED 119*b* across an illumination field of view (not shown) to illuminate a barcode within the illumination FOV.

An aiming light assembly is also mounted in the imaging reader 100 and preferably includes an aiming light source 123, (e.g., one or more aiming LEDs), and an aiming lens 125 for generating and directing a visible aiming light beam away from the reader 100 onto the target 113*a*, 113*b* in the handheld mode. The aiming light beam has a cross-section with a pattern, for example, a generally circular spot or cross-hairs for placement at the center of the target 113*a*, 113*b*, or a line for placement across the target 113*a*, 113*b*, or a set of framing lines to bound the field of view, to assist an operator in visually locating the target 113*a*, 113*b* within the field of view prior to image capture.

In an embodiment, an image of the aiming pattern on the target 113*a*, 113*b* is used to determine the distance of the target 113*a*, 113*b* from the reader 100. In one example, parallax of the image of the aiming pattern on the target 113*a*, 113*b* is used to approximate the distance of the target 113*a*, 113*b* from the reader 100 by determining the position of the aiming pattern within the field of view and, responsive to the pattern appearing within any one of a number of predetermined sections of the field of view, determining the distance based on the respective one of the section.

As also shown in FIG. 2, the imager 111, the illumination LEDs 119a, 119b, and the aiming LED 123 are operatively connected to a controller or programmed microprocessor 127 operative for controlling the operation of these components. A memory 129 is connected and accessible to the controller 127. Preferably, the microprocessor 127 is the same as the one used for processing the captured return light from the illuminated target 113a, 113b to obtain data related to the target 113a, 113b.

As further illustrated in FIG. 2, a decode module (also known as a decoder) 131 is operatively coupled to the controller 127. The decode module 131 provides the necessary circuitry and/or firmware to detect and decode various symboligies present in the image data captured by the imager 111.

Figure 3:
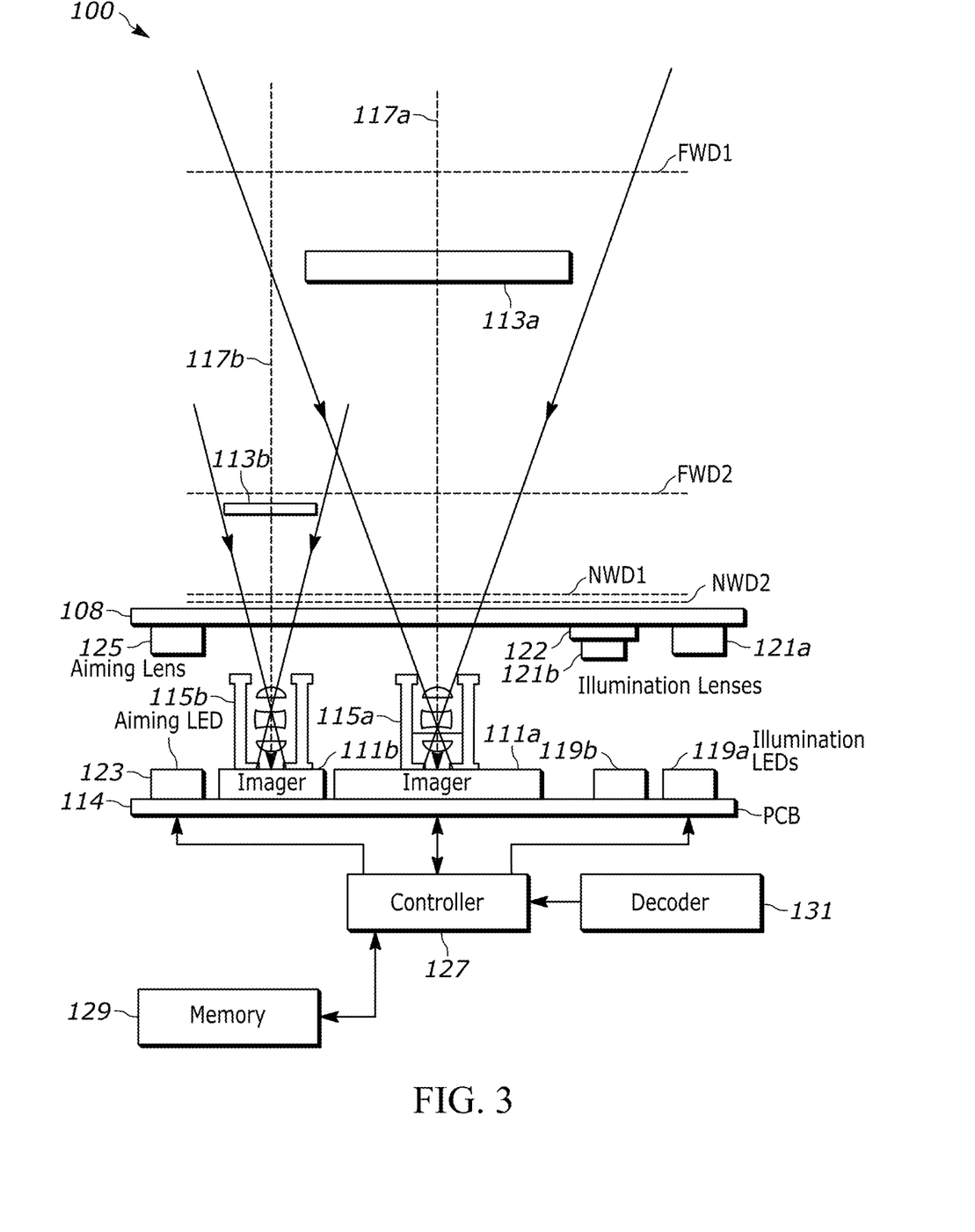
FIG. 3 is a schematic of various components of the data capture device of FIG. 1 in accordance with another embodiment.

FIG. 3 is an alternative embodiment of the reader 100 of FIG. 1. In FIG. 3, like elements are indicated by like references as in FIG. 2, and need not be discussed further for this embodiment. The imaging engine includes multiple light-detecting sensors or imagers 111a, 111b operatively coupled to, or mounted on, a printed circuit board (PCB) 114. In an embodiment, each imager 111a, 111b is a solid-state device, for example, a CCD or a CMOS imager having a two-dimensional array of addressable image sensors or pixels arranged in mutually orthogonal rows and columns and operating in a global shutter mode, and operative for for detecting return light captured by respective imaging lens assemblies 115a, 115b over a field of view along respective imaging axes 117a, 117b through the window 108. The return light is scattered and/or reflected from a target 113a, 113b over the respective fields of view. Each imager 111a and 111b can be seen as being a part of a respective imaging assembly which includes respective optics for focusing light for each of the imagers. Additionally, references can be made to an imaging-based data acquisition assembly which can include one or multiple imaging assemblies, each with its respective imager.

In an embodiment, each lens assembly 115a, 115b has a different focal plane. For example, a first lens assembly 115a may be a fixed focus lens assembly that has a focal plane for reading a low-density target 113a within the first far working distance (FWD1) and the first near working distance (NWD1), whereas a second lens assembly 115b may be a fixed focus lens assembly that has a focal plane for reading a high-density target 113b between the second far working distance (FWD2) and the second near working distance (NWD2). In another embodiment, either or both of the lens assemblies may be automatic focus lens assemblies as discussed above, though each optimized for focusing on targets 113a, 113b within their respective working distances.

In some embodiments, the reader 100 of FIG. 3 utilizes active methods for determining which image assembly to utilize, such as a rangefinder (infrared, ultrasound, etc.) and time-of-flight techniques. Alternatively, the reader 100 of FIG. 3 may utilize parallax or magnification of the aiming pattern from the aiming light assembly to approximate the distance of the target from the reader 100, as discussed above.

Based on the distance of the target 113a, 113b from the reader 100, the controller 127 selects the corresponding image assembly (and illumination assembly, if applicable) to capture an image of the target 113a, 113b. For example, for the target 113a, the controller 127 may determine the appropriate distance to the target 113a, activate the illumination source 119a, and cause the imager 111a to capture an image of the target 113a. On the other hand, for the target 113b, the controller 127 may determined the appropriate distance, activate the illumination source 119b, and cause the imager 111b to capture an image of the target 113b.

In another embodiment, each imager 111a, 111b may capture an image of its respective target 113a, 113b and the controller 127 may determine which is most in-focus (e.g., phase detection, contrast detection, etc.). Thereafter, the controller 127 may transmit the image to the decode module for further processing.

It should be appreciated that while a particular form factor has been described above, it should not be viewed as limited and other examples of data capture devices and barcode readers fall within the scope of the present disclosure. For example, assemblies like imaging engines for integration into barcode readers are also within the scope of devices contemplated by the present disclosure and should be seen as falling within the scope of term barcode reader, symbology reader, or the like.

Imaging-based data capture device like the one described above may be used to implement various embodiments associated with reducing perceived illumination flicker.

As noted earlier, during the transition from operating one of the imaging assemblies to operating another of the imaging assemblies, during focusing operations where a sensor is deactivated (in other words it stops streaming image data and/or goes into an idle state) and reactivated, or other operations which require a stop in image capture, a corresponding pause in the operation of the illumination assembly may result in perceived flicker of that illumination. To address this issue, the present disclosure proposes a novel approach to inserting one or more dummy illumination pulse between certain exposures. As used herein, references to a 'dummy illumination pulse' should be understood as references to an illumination pulse that is not required for image capture and subsequent image analysis, where that pulse may occur during the exposure window or outside the exposure window. Additionally, it should be understood that references to various sequences refers to a set of preconfigured image capture operations which directed to a particular task. For example, a symbology reader may undergo a ranging sequence where the reader captures one or more frames to determine a distance to an object. In some instances, this can involve taking a frame with the aim light on and another frame with the aim light off. Thereafter the frames can be compared to determine the position of the aim pattern within the field of view of the reader. Another example of a sequence may be a focusing sequence where the reader may alternate between a near imaging assembly and a far imaging assembly one or more times in an attempt to obtain at least one successful image for decode purposes. Another example of a sequence may be a bracketing sequence where the focus is dithered across several frames around a focus point. Still yet another example of a sequence is a ramping sequence where the focus is adjusted across a range of focus points that cover a particular focus range.

While it is normally expected that an imaging assembly will go into an idle state at the end of a sequence (even if the same assembly is the first assembly to be used in the next sequence), it is also conceivable that multiple imaging assemblies will be used in a single sequence, causing a deactivation of image capture operations on at least one of the sensors. For example, during a focusing sequence where the reader is configured to alternate between a near imager and a far imager, the sequence may include one frame captured by a near imager followed by one frame captured by a far imager, followed by multiple frames captured by the near imager, followed by multiple frames captured by the far imager. In this case, the near imager and the far imager temporary enter an idle state within the sequence itself.

Figure 4:
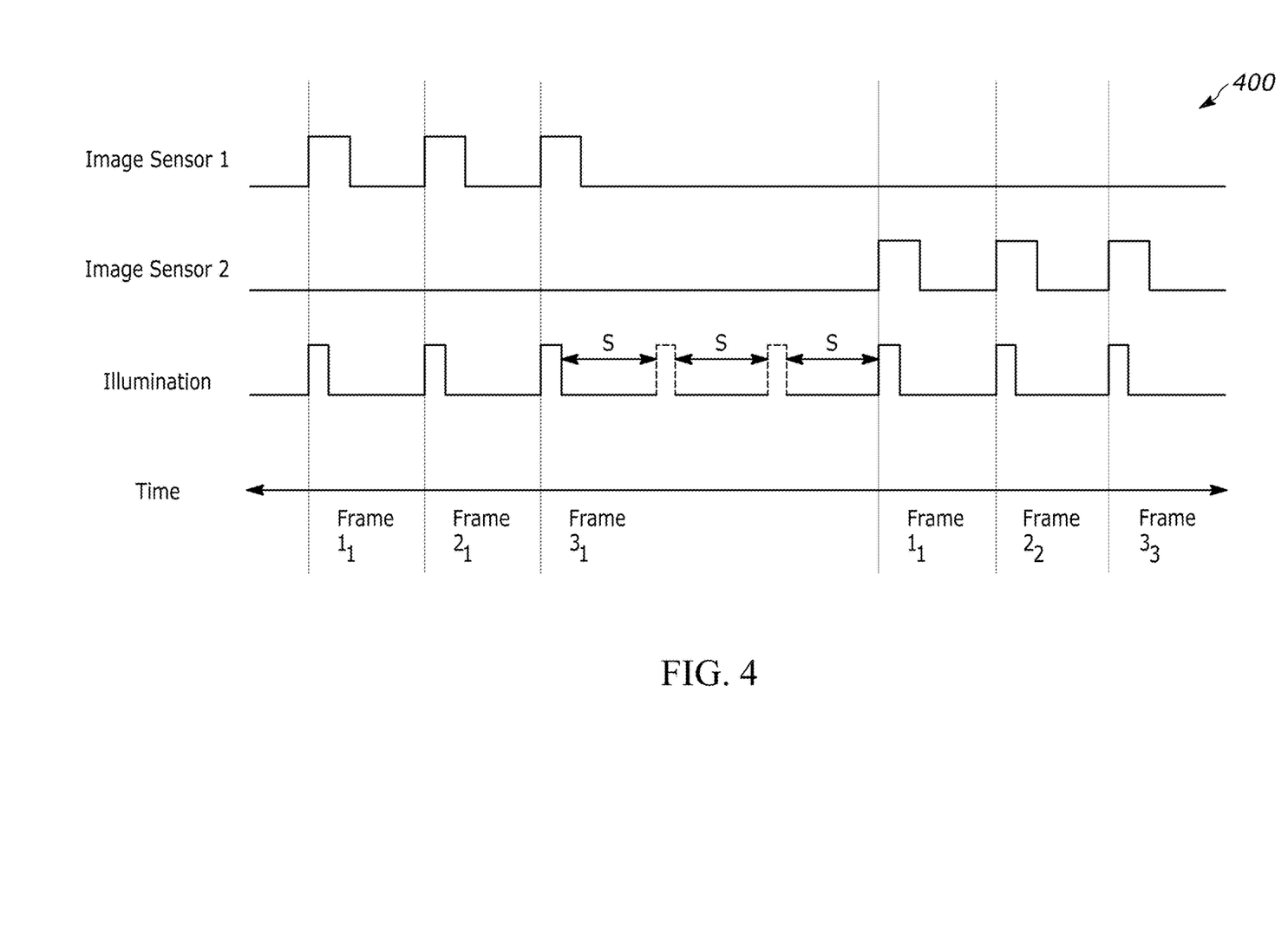
FIG. 4 is an example timing diagram illustrating the operation of a multi-sensor an imaging-based data capture device.
Figure 5:
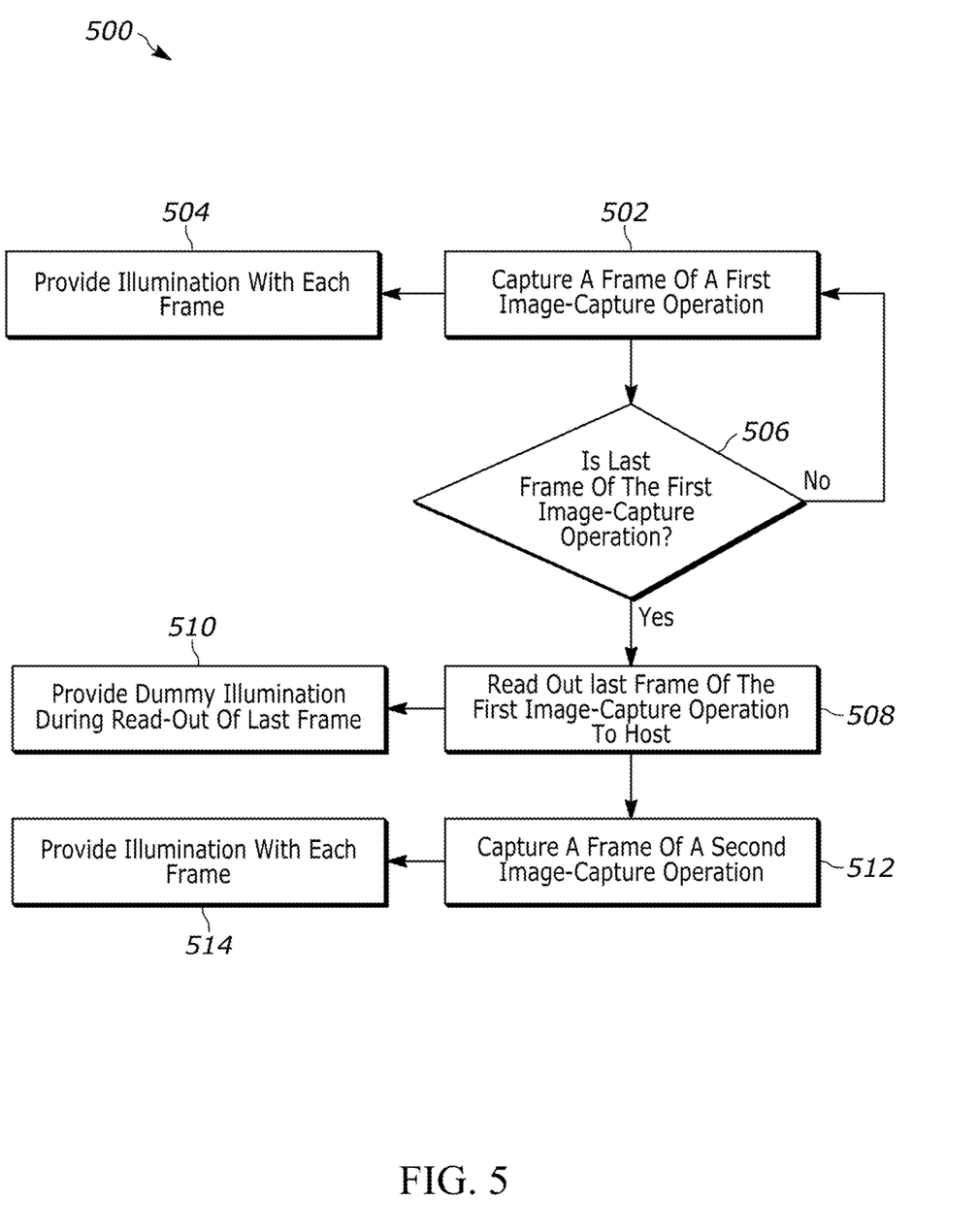
FIG. 5 is a flowchart representative of an example process flow associated with the timing diagram of FIG. 4.

Referring to FIGS. 4 and 5, shown therein, respectively, is an example of a timing diagram 400 illustrating the operation of a multi-sensor imaging-based data capture device (like a barcode reader 100) and a corresponding flowchart 500 representative of a method for reducing perceived illumination flicker when switching between sensor operations.

The method begins with performing a first image-capture operation 502 whereby one or more frames are acquired by a first image sensor. The first image sensor may be image sensor 111a and may be a part of a first imaging assembly that, for example, may be configured to capture image data over a relatively near distance. In the example of FIG. 4, the first image-capture operation may be seen as occurring over the first three frames FRAME $1_1$-FRAME $3_1$. During each of these frames, an illumination assembly, which may be comprised of an LED 119a and a corresponding lens 121a, provides a pulse of illumination 504 which coincides with the sensor 1 exposure. As can be seen in the diagram, while providing illumination during each frame of a streaming image sensor can avoid the perceived appearance of flicker (particularly if the frame rate is above 30 frames per second (fps)), the deactivation of the image stream creates a pause between the last frame, FRAME $3_1$, of the first image-capture operation and the first frame of a subsequent image-capture operation, which may be seen as occurring over the last three frames FRAME $1_2$-FRAME $3_2$.

For purposes of this disclosure, during sequential image capture by a sensor, the end of the frame may be the moment a last row of pixels is read out by the sensor to an on-sensor video processor. When the sensor is instructed to stop streaming, the end of the frame may be the moment that the last row is transmitted to the host by the on-sensor video processor. In this case the host may be a processor or a memory to which the image sensor transmits the data via, for example, a MIPI interface. Normally the duration between the start of the exposure of the last frame of a sensor (prior to the sensor going idle) (e.g., FRAME $3_1$) and the start of the exposure of the first frame of the same or different sensor (e.g., FRAME $1_2$) will be longer than the duration between the start of the first frame (e.g., FRAME $1_1$) of a given operation and a second frame (e.g., FRAME $2_1$) of that operation where the sensor is not deactivated between the frames. For example, if a sensor is operating at 60 fps, the duration between the starts of each exposure will have a duration of 16.67 milliseconds. However, the duration between the last exposure and a subsequent exposure will be greater than 16.67 milliseconds. Additionally, any processing delays for activating the subsequent image-capture operation may be seen as falling within the scope of the last frame of a preceding image-capture operation. Moreover, there may be instances of the image-capture operation being comprised of only a single frame rather than multiple frames. In this case, the first frame of the respective image-capture operation is also its last frame. It should also be appreciated that with a single-frame operation like this, even if the sensor operates at 60 fps and is instructed to capture a single frame, the duration until a subsequent image capture operation will once again be longer than 16.67 milliseconds.

Returning to FIG. 4, to address resulting lack of illumination during the relatively extended period of time during the last frame of the first image-capture operation, the processor of the imaging-based data capture device may instruct the illumination assembly to inserting at least one dummy illumination pulse during the last frame of the first image-capture operation. The specific number N of dummy illumination pulses is based at least in part on at least one of a frame transmission time of the last frame of the first image-capture operation or an exposure duration of the first frame of the second image-capture operation.

In the illustrated example, the frame transmission time of the last frame FRAME $3_1$ of the first image-capture operation is used to determine the number of pulses that need to be inserted prior to FRAME $1_2$. This can be calculated by the following equation (1):

$$N = F / \left(\frac{1000}{FPS}\right) \quad (1)$$

where F is the frame transmission time of the last frame of the first image-capture operation in milliseconds, FPS is a frames-per-second framerate at which one of the first image-capture operation is performed or the second image-capture operation is performed, and N is rounded up or down to a whole number. In some examples, the FPS value is based on the time interval between the vertical synch (vsynch) signal of the image sensor between consecutive frames. As such, with a vsynch interval of 16.67 milliseconds the FPS value is 60, with an interval of 22.22 milliseconds the FPS value is 45, with an interval of 33.33 milliseconds the FPS value is 30, with an interval of 66.66 milliseconds the FPS value is 15, and with an interval of 100 milliseconds the FPS value 10. Returning to equation (1), as an example, with a 40 ms transmit time and a 60 fps image-capture operation, N=40/16.67=2.4. Rounding this number down provides a value of two which means that at least two additional pulses are needed to be inserted during the last frame FRAME$3_1$ to avoid a perceived appearance of illumination flicker. These pulses are illustrated as dashed pulses in the in the diagram of FIG. 4. Preferably, this calculation is performed during the second-to-last frame FRAME$2_1$ of the first image-capture operation or earlier.

Returning to flowchart 500, if the frame that is captured during operation 502 is the last frame of the first image-capture operation 506, the image sensor proceeds to reading out that frame to the host 508 and during this readout period the device processor instructs the illumination assembly to provide at least dummy illumination pulse 510, as described above.

To help ensure a consistent illumination appearance, the dummy pulse(s) are preferably positioned equally between beginning of the last frame FRAME$3_1$ of the first image-capture operation and the first frame FRAME$1_2$ of the second image-capture operation. Depending on the number of frames in each operation, the spacing S can be the spacing between at least one of (i) a plurality of dummy illumination pulses that are inserted during the last frame of the first image-capture operation, (ii) an end of exposure of the last frame of the first image-capture operation and one of the at least one dummy illumination pulse that is inserted during the last frame of the first image-capture operation, or (iii) one of the at least one dummy illumination pulse that is inserted during the last frame of the first image-capture operation and a beginning of exposure of the first frame of the second image-capture operation, where S is defined by the following equation (2):

$$S = \frac{F - (N*D)}{N+1} \quad (2)$$

and where D is a duration of the at least one dummy illumination pulse. In some embodiments D is less than or equal to 5 ms, 4 ms, 3 ms, 2 ms, 1.5 ms, or 1 ms. Utilizing the example above where N is equal to 2 and selecting D of 1.5 ms, the spacing S between the pulses is S=(40 ms−(2*1.5 ms))/3=12.33 ms. As a result, the spacing between the end of an illumination pulse and the beginning of a subsequent illumination pulse is 12.33 ms. A particular advantage of evenly spacing the illumination pulses and/or reducing the number of necessary pulses necessary to maintain a constant illumination appearance is that the illumination boost circuitry that may be present within the device has sufficient amount of time to recharge, avoiding potential faults with the illumination system.

Once the last frame FRAME3$_1$ of the first image-capture operation has been read out, the method proceeds to step 512 where the data capture device proceeds to perform a second image-capture operation via a second image sensor or a second imaging assembly. As with the first image-capture operation, each frame of the second image-capture operation includes an illumination pulse 514 that coincides with the exposure. By this approach, despite having a relatively long frame between the image-capture operations, the reader maintains a relatively consistent illumination pulse pattern such that illumination flicker is avoided or reduced as observed by a human observer.

It should be appreciated that while the illumination pulses are shown as overlapping exposures of each of the frames, this is not necessary as in some instances (for example, frames configured to capture information presented on a cell-phone screen) the illumination pulse may be shifted to only partially overlap with the exposure of a given frame or to not overlap at all. In this way, the device can still provide an illumination pulse for each frame of a set of frames, but those pulses may or may not overlap with the exposure of the frames.

Figure 6:
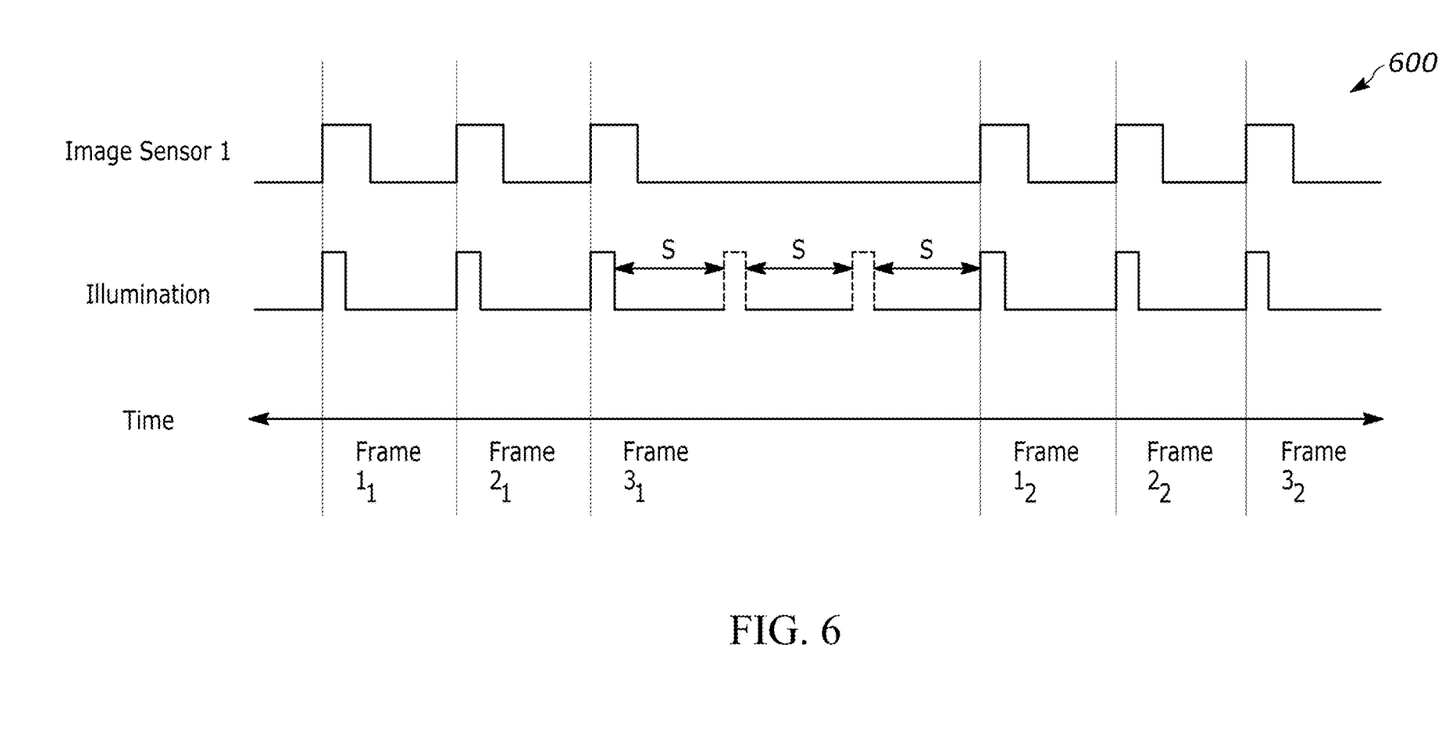
FIG. 6 is another example timing diagram illustrating the operation of a multi-sensor an imaging-based data capture device.

Another example timing diagram 600 is illustrated in FIG. 6 where the diagram represents the operation of a single imaging assembly having its respective image sensor. As with the prior example, the diagram represents two image-capture operations. The first operation is encompassed by frames FRAME 1$_1$-FRAME 3$_1$ and the second operation is encompassed by frames FRAME 1$_2$-FRAME 3$_2$. Since both operations are performed by the same sensor which runs at a given framerate and since the exposure duration of the frames in the second operation may differ from the exposure duration of the first operation, the approach in this example takes into consideration both the framerate and the exposure duration of the first frame of the second operation. In particular, the number of pulses that need to be inserted prior to FRAME 1$_2$ can be calculated by the following equation (3):

$$N = \frac{\left(\frac{1000}{FPS}\right) - E}{X} \quad (3)$$

where FPS is a frames-per-second framerate of either the first image-capture operation, E is the exposure duration of the first frame FRAME 1$_2$ of the second image-capture operation, X is greater than 30 milliseconds, and N is rounded up or down to a whole number. As an example, with a sensor operating at 10 FPS and an expected exposure of 2 millisecond for FRAME 1$_2$, N=(100 ms−2 ms)/33.33 ms=2.94. Rounded down gives a value of 2, indicating that two pulses should be inserted to help reduce flicker.

As with the previous example, to help ensure a consistent illumination appearance, the dummy pulse(s) are preferably positioned equally between beginning of the last frame FRAME3$_1$ of the first image-capture operation and the first frame FRAME1$_2$ of the second image-capture operation. Depending on the number of frames in each operation, the spacing S can be the spacing between at least one of (i) a plurality of dummy illumination pulses that are inserted during the last frame of the first image-capture operation, (ii) an end of exposure of the last frame of the first image-capture operation and one of the at least one dummy illumination pulse that is inserted during the last frame of the first image-capture operation, or (iii) one of the at least one dummy illumination pulse that is inserted during the last frame of the first image-capture operation and a beginning of exposure of the first frame of the second image-capture operation, where S is defined by the following equation (4):

$$S = \frac{\left(\left(\frac{1000}{FPS}\right) - E\right) - (N*D)}{N+1} \quad (4)$$

and where D is a duration of the at least one dummy illumination pulse that is inserted during the last frame of the first image-capture operation. In some embodiments D is less than or equal to 5 ms, 4 ms, 3 ms, 2 ms, 1.5 ms, or 1 ms. Utilizing the example above where N is equal to 2 and selecting D of 1.5 ms, the spacing S between the pulses is S=((100 ms−2 ms)−(2*1.5 ms))/3=31.67 ms. As a result, the spacing between the end of an illumination pulse and the beginning of a subsequent illumination pulse is 31.67 ms.

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for reducing perceived illumination flicker in an imaging-based data capture device, the method comprising the steps of:
   performing a first image-capture operation including a last frame of the first image-capture operation;
   subsequent to performing the first image-capture operation, performing a second image-capture operation including a first frame of the second image-capture operation; and
   inserting at least one dummy illumination pulse during the last frame of the first image-capture operation, wherein a number N of the at least one dummy illumination pulses is based on at least one of a frame transmission time of the last frame of the first image-capture operation or an exposure duration of the first frame of the second image-capture operation.

2. The method of claim 1, wherein:

F is the frame transmission time, in milliseconds, of the last frame of the first image-capture operation;

FPS is a frames-per-second framerate at which one of the first image-capture operation is performed or the second image-capture operation is performed;

$$N = F \bigg/ \left(\frac{1000}{FPS}\right);$$

and

N is rounded up or down to a whole number.

3. The method of claim 2, wherein the first image-capture operation is performed by a first imaging assembly and the second image-capture operation is performed by a second imaging assembly.

4. The method of claim 2, wherein:

D is a duration of the at least one dummy illumination pulse that is inserted during the last frame of the first image-capture operation;

S is a spacing between at least one of (i) a plurality of dummy illumination pulses that are inserted during the last frame of the first image-capture operation, (ii) an end of exposure of the last frame of the first image-capture operation and one of the at least one dummy illumination pulse that is inserted during the last frame of the first image-capture operation, or (iii) one of the at least one dummy illumination pulse that is inserted during the last frame of the first image-capture operation and a beginning of exposure of the first frame of the second image-capture operation; and $$S = \frac{F - (N*D)}{N+1}.$$

5. The method of claim 4, wherein D is less than or equal to 5 milliseconds.

6. The method of claim 1, wherein:

the first image-capture operation and the second image-capture operation are both performed by a first imaging assembly;

FPS is a frames-per-second framerate of the first imaging assembly;

E is the exposure duration of the first frame of the second image-capture operation;

X is greater than 30 milliseconds;

$$N = \left(\left(\frac{1000}{FPS}\right) - E\right) \bigg/ X;$$

and

N is rounded up or down to a whole number.

7. The method of claim 6, wherein:

D is a duration of the at least one dummy illumination pulse that is inserted during the last frame of the first image-capture operation;

S is a spacing between at least one of (i) a plurality of dummy illumination pulses that are inserted during the last frame of the first image-capture operation, (ii) an end of exposure of the last frame of the first image-capture operation and one of the at least one dummy illumination pulse that is inserted during the last frame of the first image-capture operation, or (iii) one of the at least one dummy illumination pulse that is inserted during the last frame of the first image-capture operation and a beginning of exposure of the first frame of the second image-capture operation; and $$S = \frac{\left(\left(\frac{1000}{FPS}\right) - E\right) - (N*D)}{N+1}.$$

8. The method of claim 1, wherein the first image-capture operation includes a first sequence of frames directed to a first operation of the imaging-based data capture device, and wherein the second image-capture operation includes a second sequence of frames directed to a second operation of the imaging-based data capture device, the first operation being different from the second operation.

9. The method of claim 1, wherein the first image-capture operation and the second image-capture operation are both part of a first sequence of frames directed to a first operation of the imaging-based data capture device.

10. The method of claim 1, wherein the last frame of the first image-capture operation is associated with a frame after which a respective imaging sensor of a respective imaging assembly goes into an idle state.

11. An imaging-based data capture device comprising:

an imaging-based data acquisition assembly;

an illumination assembly configured to provide illumination for imaging-based data acquisition assembly;

a processor communicatively coupled to the imaging-based data acquisition assembly and the illumination assembly; and a memory communicatively coupled to the processor, the memory storing machine-readable instructions that, when executed by the processor, cause the imaging-based data capture device to:

perform, via the imaging-based data acquisition assembly, a first image-capture operation including a last frame of the first image-capture operation;

perform, via the imaging-based data acquisition assembly, a second image-capture operation including a first frame of the second image-capture operation; and insert at least one dummy illumination pulse, provided by the illumination assembly, during the last frame of the first image-capture operation, wherein a number N of the at least one dummy illumination pulses is based on at least one of a frame transmission time of the last frame of the first image-capture operation or an exposure duration of the first frame of the second image-capture operation.

12. The imaging-based data capture device of claim 11, wherein:

F is the frame transmission time, in milliseconds, of the last frame of the first image-capture operation;

FPS is a frames-per-second framerate at which one of the first image-capture operation is performed or the second image-capture operation is performed;

$$N = F \bigg/ \left(\frac{1000}{FPS}\right);$$

and

N is rounded up or down to a whole number.

13. The imaging-based data capture device of claim 12, wherein the imaging-based data acquisition assembly includes a first imaging assembly and a second imaging assembly, and wherein the first image-capture operation is performed by a first imaging assembly and the second image-capture operation is performed by a second imaging assembly.

14. The imaging-based data capture device of claim 12, wherein:

D is a duration of the at least one dummy illumination pulse that is inserted during the last frame of the first image-capture operation;

S is a spacing between at least one of (i) a plurality of dummy illumination pulses that are inserted during the last frame of the first image-capture operation, (ii) an end of exposure of the last frame of the first image-capture operation and one of the at least one dummy illumination pulse that is inserted during the last frame of the first image-capture operation, or (iii) one of the at least one dummy illumination pulse that is inserted during the last frame of the first image-capture operation and a beginning of exposure of the first frame of the second image-capture operation; and $$S = \frac{F - (N*D)}{N}.$$

15. The imaging-based data capture device of claim 14, wherein D is less than or equal to 5 milliseconds.

16. The imaging-based data capture device of claim 11, wherein:

the first image-capture operation and the second image-capture operation are both performed by a first imaging assembly of the imaging-based data acquisition assembly;

FPS is a frames-per-second framerate of the first imaging assembly;

E is the exposure duration of the first frame of the second image-capture operation;

X is greater than 30 milliseconds;

$$N = \left(\left(\frac{1000}{FPS}\right) - E\right) \Big/ X;$$

and

N is rounded up or down to a whole number.

17. The imaging-based data capture device of claim 16, wherein:

D is a duration of the at least one dummy illumination pulse that is inserted during the last frame of the first image-capture operation;

S is a spacing between at least one of (i) a plurality of dummy illumination pulses that are inserted during the last frame of the first image-capture operation, (ii) an end of exposure of the last frame of the first image-capture operation and one of the at least one dummy illumination pulse that is inserted during the last frame of the first image-capture operation, or (iii) one of the at least one dummy illumination pulse that is inserted during the last frame of the first image-capture operation and a beginning of exposure of the first frame of the second image-capture operation; and $$S = \frac{\left(\left(\frac{1000}{FPS}\right) - E\right) - (N*D)}{N}.$$

18. The imaging-based data capture device of claim 11, wherein the first image-capture operation includes a first sequence of frames directed to a first operation of the imaging-based data capture device, and wherein the second image-capture operation includes a second sequence of frames directed to a second operation of the imaging-based data capture device, the first operation being different from the second operation.

19. The imaging-based data capture device of claim 11, wherein the first image-capture operation and the second image-capture operation are both part of a first sequence of frames directed to a first operation of the imaging-based data capture device.

20. The imaging-based data capture device of claim 11, wherein the last frame of the first image-capture operation is associated with a frame after which a respective imaging sensor of the imaging-based data acquisition assembly goes into an idle state.

* * * * *